(12) United States Patent
Nguyen

(10) Patent No.: US 11,328,510 B2
(45) Date of Patent: May 10, 2022

(54) INTELLIGENT VIDEO ANALYSIS

(71) Applicant: The Boeing Company, Chicago, IL (US)

(72) Inventor: Hieu T. Nguyen, Madison, AL (US)

(73) Assignee: The Boeing Company, Chicago, IL (US)

( * ) Notice: Subject to any disclaimer, the term of this patent is extended or adjusted under 35 U.S.C. 154(b) by 91 days.

(21) Appl. No.: 16/357,378

(22) Filed: Mar. 19, 2019

(65) Prior Publication Data
US 2020/0302177 A1   Sep. 24, 2020

(51) Int. Cl.
| | | |
|---|---|---|
| G06V 20/40 | (2022.01) | |
| G06F 16/901 | (2019.01) | |
| G06F 17/15 | (2006.01) | |
| G06K 9/62 | (2022.01) | |
| G06N 3/04 | (2006.01) | |
| G06N 5/02 | (2006.01) | |
| G06T 11/20 | (2006.01) | |

(52) U.S. Cl.
CPC .......... *G06V 20/41* (2022.01); *G06F 16/9024* (2019.01); *G06F 17/15* (2013.01); *G06K 9/6267* (2013.01); *G06N 3/04* (2013.01); *G06N 5/02* (2013.01); *G06T 11/20* (2013.01); *G06T 2210/12* (2013.01)

(58) Field of Classification Search
None
See application file for complete search history.

(56) References Cited

U.S. PATENT DOCUMENTS

| | | | | |
|---|---|---|---|---|
| 2008/0100704 | A1* | 5/2008 | Venetianer | G08B 29/188 |
| | | | | 348/143 |
| 2011/0043627 | A1* | 2/2011 | Werling | G06T 19/006 |
| | | | | 348/143 |
| 2012/0062732 | A1* | 3/2012 | Marman | G08B 13/19682 |
| | | | | 348/142 |

(Continued)

OTHER PUBLICATIONS

Xu, Zheng, Yunhuai Liu, Lin Mei, Chuanping Hu, and Lan Chen. "Semantic based representing and organizing surveillance big data using video structural description technology." Journal of Systems and Software 102 (2015): 217-225. (Year: 2015).*

(Continued)

*Primary Examiner* — David Perlman
(74) *Attorney, Agent, or Firm* — Womble Bond Dickinson (US) LLP

(57) ABSTRACT

An apparatus is provided. The apparatus receives a video feed and processes the video feed in real-time as the video feed is received. The apparatus performs object detection and recognition on the video feed to detect and classify objects therein, performs activity recognition to detect and classify activities of at least some of the objects, and outputs classified objects and classified activities in the video feed. The apparatus generates natural language text that describes the video feed, produces a semantic network, and stores the video feed, classified objects and classified activities, natural language text, and semantic network in a knowledge base. The apparatus generates a graphical user interface (GUI) configured to enable queries of the knowledge base, and presentation of selections of the video feed, classified objects and classified activities, natural language text, and semantic network.

27 Claims, 10 Drawing Sheets

(56) References Cited

U.S. PATENT DOCUMENTS

| | | | | |
|---|---|---|---|---|
| 2014/0328570 | A1* | 11/2014 | Cheng | G06F 16/43 |
| | | | | 386/241 |
| 2016/0165193 | A1* | 6/2016 | Rasheed | H04N 7/188 |
| | | | | 348/143 |
| 2016/0378861 | A1* | 12/2016 | Eledath | G06K 9/00718 |
| | | | | 707/766 |
| 2019/0146511 | A1* | 5/2019 | Hurd | G06N 3/0454 |
| | | | | 701/27 |

OTHER PUBLICATIONS

European Search Report from the corresponding European Patent Application No. 20162295.8, dated Sep. 2, 2020.

Tae Eun Choe, et al., "Semantic Video Event Search for Surveillance Video", proceedings of the 2011 IEEE International Conference on Computer Vision Workshops (ICCV Workshops), Intelligent Automation Inc., Rockville, MD, USA, Nov. 6, 2011, pp. 1963-1970.

"Line Graph—Wikipedia", Wikipedia, retrieved Aug. 19, 2020, from <https://en.wikipedia.org/w/index.php?title=Line_graph&oldid=881537430>, Feb. 3, 2019, 14 pages.

Shaikh, S.H. et al., "A Brief Review of the Literature on Moving Object Detection", in Chapter 3.3 of "Moving Object Detection Using Background Subtraction", Springer International Publishing AG., 2014, pp. 16-20.

Menshawy, Ahmed, "Introduction to Convolutional Neural Networks", in Chapter 7 of "Introduction to Convolutional Neural Networks", Packt Publishing, Limited, 2018, pp. 185-186.

* cited by examiner

| | TrackID | Class | Start | End | Camera | Size(m) | |
|---|---|---|---|---|---|---|---|
| | 5390 | Others | Thu Nov 17 08:15:17 2... | 08:15:24 | Cam 0 | 6.8 | appeared in Parking Lot, |
| | 10012432 | Car | Thu Nov 17 08:14:20 2... | 08:14:24 | Cam 1 | 6.6 | Car, appeared in Laker Village Dr 2, |
| | 10012883 | SUV | Thu Nov 17 08:24:40 2... | 08:24:44 | Cam 1 | 7 | SUV, appeared in Laker Village Dr 2, |
| | 10012674 | Car | Thu Nov 17 08:21:28 2... | 08:21:31 | Cam 1 | 5.8 | Car, appeared in Laker Village Dr 2, |
| | 10012590 | Car | Thu Nov 17 08:19:43 2... | 08:19:50 | Cam 1 | 5 | Car, appeared in Laker Village Dr 2, |
| | 10012526 | Car | Thu Nov 17 08:18:40 2... | 08:18:44 | Cam 1 | 5.1 | Car, appeared in Laker Village Dr 2, |

INTELLIGENT VIDEO ANALYSIS

TECHNOLOGICAL FIELD

The present disclosure relates generally to intelligent video analysis, and in particular, to intelligent video analysis supporting real-time monitoring and offline search and retrieval.

BACKGROUND

Video analysis can be used in many applications such as in video surveillance systems. Video analysis often involves human operators manually watching video streams and producing verbal narratives of video contents. However, in many applications, cameras and imaging sensors used in video analysis produce large amounts of streaming and archived video data that may be impractical for human to analyze, understand and respond.

Existing automated video analysis systems can perform video analysis with less manpower. However, many existing automated video analysis systems work only for stationary cameras and provide only object detection. That is, many existing automated video analysis systems cannot work for moving cameras and do not provide multiple functions such as tracking moving objects, activity recognition, visually presenting semantic relationships of objects in video feeds, and intelligent video retrieval.

Therefore, it would be desirable to have a system and method that takes into account at least some of the issues discussed above, as well as other possible issues.

BRIEF SUMMARY

Example implementations of the present disclosure are directed to intelligent video analysis supporting real-time monitoring and offline search and retrieval. Example implementations of the present disclosure can receive and analyze video data in real-time and implement machine learning algorithms to identify and track objects of interest. Example implementations of the present disclosure can describe tracked objects using a natural language representation.

Example implementations of the present disclosure can receive data from various stationary and mobile video feeds. Example implementations of the present disclosure can integrate advanced computer vision and machine learning capabilities in object detection, tracking, geo-registration, activity recognition, video captioning and graph-based content representation. Example implementations of the present disclosure can provide automated semantic parsing of large amounts of streaming video data in real-time monitoring and support offline search and retrieval. Example implementations of the present disclosure can be deployed in a wide range of platforms such as manned or unmanned aerial vehicles, satellite, street security cameras, body-worn cameras and personal mobile phones.

Also, example implementations of the present disclosure can provide video forensic analysis such as efficient content browsing and navigation through large video archives. Example implementations of the present disclosure support quick search and retrieval of past events using various types of semantic-based video queries (e.g., by keywords, by geo-spatial areas or by visual similarity). Example implementations of the present disclosure can support both stationary and mobile camera platforms and can automatically extract highly semantic content information from video feeds, which can be stored and retrieved efficiently offline.

Example implementations of the present disclosure can reduce required manpower and reliance on manpower in video surveillance applications, and save human operators from spending long hours on manually watching live video feeds and searching video archives for past events.

The present disclosure thus includes, without limitation, the following example implementations.

Some example implementations provide a method automatic target recognition with reinforcement learning, comprising: receiving a video feed; processing the video feed in real-time as the video feed is received, including: performing object detection and recognition on the video feed to detect and classify objects therein, performing activity recognition to detect and classify activities of at least some of the objects, and outputting classified objects and classified activities in the video feed; generating natural language text that describes the video feed from the classified objects and activities; producing a semantic network including a graph with vertices that represent the classified objects, and edges that connect the vertices and represent semantic relationships between the classified objects, at least some of the semantic relationships corresponding to respective ones of the classified activities; and storing the video feed, classified objects and classified activities, natural language text, and semantic network in a knowledge base; and generating a graphical user interface (GUI) configured to enable queries of the knowledge base, and presentation of selections of the video feed, classified objects and classified activities, natural language text, and semantic network.

In some example implementations of the method of any preceding example implementation, or any combination of preceding example implementations, receiving the video feed includes receiving the video feed from multiple sources, and wherein at least some of the multiple sources are moving sources.

In some example implementations of the method of any preceding example implementation, or any combination of preceding example implementations, processing the video feed further includes geo-registering the classified objects with respective geographic locations, and including respective trajectories of any moving ones of the classified objects, and wherein the GUI is further configured to present an aerial image or map of a scene in the video feed, identifying thereon the classified objects at the respective geographic locations and with the respective trajectories of the moving ones of the classified objects.

In some example implementations of the method of any preceding example implementation, or any combination of preceding example implementations, performing object detection and recognition includes assigning respective unique identifiers to the classified objects, and the presentation of selections of the video feed in the GUI includes identifying the classified objects on the video feed and including the respective unique identifiers.

In some example implementations of the method of any preceding example implementation, or any combination of preceding example implementations, wherein at least some of the objects are moving objects, and performing object detection and recognition includes detecting and classifying the moving objects using motion compensation, background subtraction and convolutional neural networks.

In some example implementations of the method of any preceding example implementation, or any combination of preceding example implementations, performing activity recognition includes detecting and classifying at least some of the activities as involving only a single one of the classified objects, multiple ones of the classified objects, or interaction between one or more of the classified objects and a geographic area in the video feed.

In some example implementations of the method of any preceding example implementation, or any combination of preceding example implementations, generating the GUI includes generating the GUI configured to enable queries of the knowledge base based on similarity between a user-specified object and one or more of the classified objects in the video feed.

Some example implementations provide an apparatus. The apparatus comprises a processor and a memory storing executable instructions that, in response to execution by the processor, cause the apparatus to at least perform the method of any preceding example implementation, or any combination of any preceding example implementations.

Some example implementations provide a computer-readable storage medium. The computer-readable storage medium is non-transitory and has computer-readable program code stored therein that in response to execution by a processor, causes an apparatus to at least perform the method of any preceding example implementation, or any combination thereof.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

FIG. 6 illustrates a presentation of a video feed in a graphical user interface, according to example implementations of the present disclosure;

FIG. 7 illustrates queries of a knowledge base, according to example implementations of the present disclosure;

DETAILED DESCRIPTION

Figure 1:
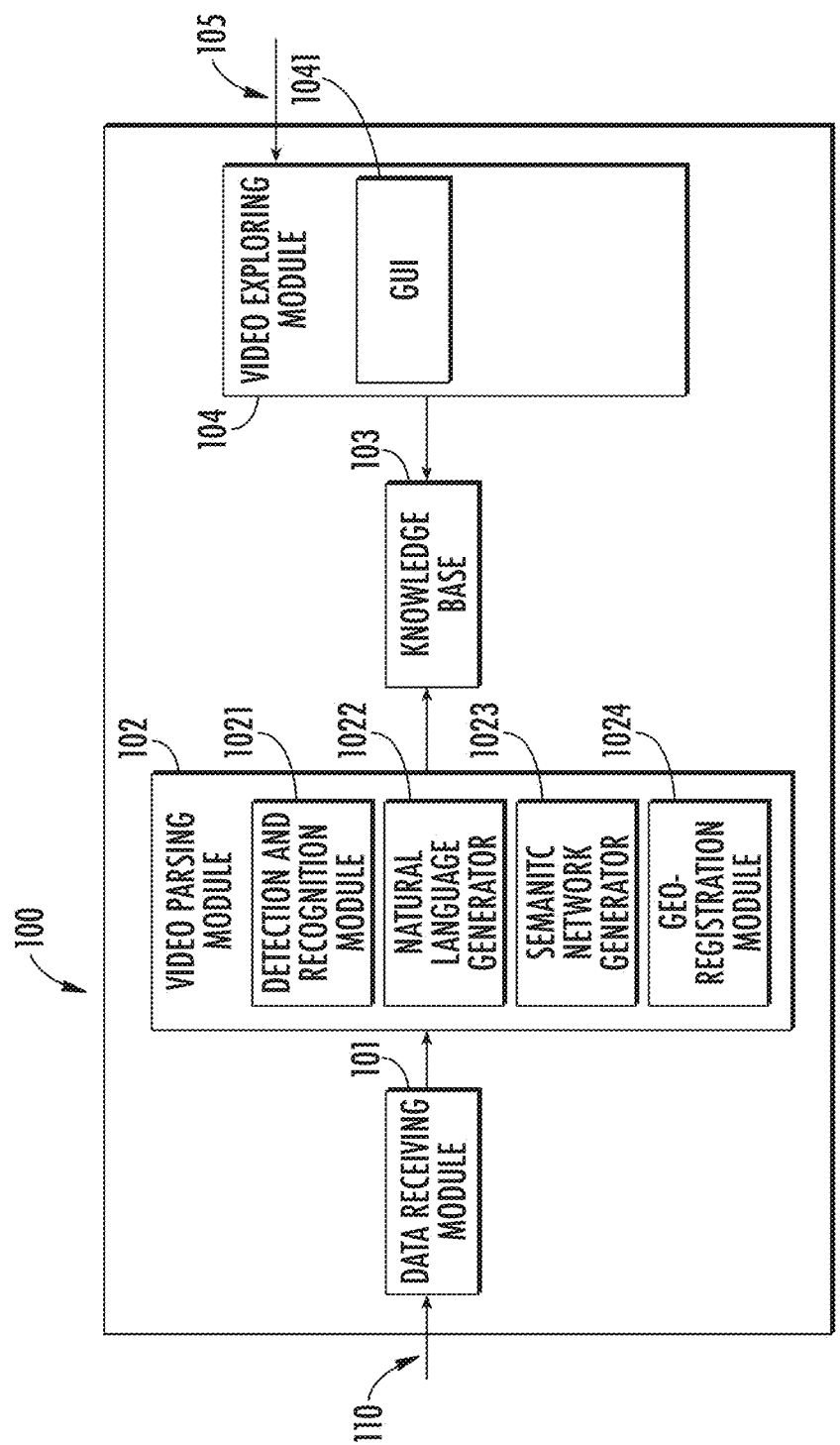
FIG. 1 illustrates a system for intelligent video analysis, according to example implementations of the present disclosure.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure are generally directed to intelligent video analysis, and in particular, to intelligent video analysis supporting real-time monitoring and offline search and retrieval.

FIG. 1 illustrates a system 100 for intelligent video analysis, according to example implementations of the present disclosure. In some examples, as described in greater detail with reference to FIG. 9, the system may be implemented by an apparatus for intelligent video analysis.

The system 100 includes any of a number of different subsystems (each an individual system) for performing one or more functions or operations. As shown, in some examples, the system includes one or more of each of a data receiving module 101, a video parsing module 102, a knowledge base 103 and a video exploring module 104. The subsystems may be co-located or directly coupled to one another, or in some examples, various ones of the subsystems may communicate with one another across one or more computer networks. Further, although shown as part of the system, it should be understood that any one or more of the data receiving module, video parsing module, knowledge base and video exploring module may function or operate as a separate system without regard to any of the other subsystems. It should also be understood that the system may include one or more additional or alternative subsystems than those shown in FIG. 1.

In some examples, the data receiving module 101 is configured to receive a video feed, as indicated by arrow 110. In some examples, the data receiving module is configured to receive the video feed from multiple sources. At least some of the multiple sources are moving sources, such as camera or imaging sensors positioned on manned or unmanned aerial vehicles. The data receiving module can provide the received video feed to the video parsing module 102. The video parsing module 102 can include a detection and recognition module 1021, a natural language generator 1022, a semantic network generator 1023 and a geo-registration module 1024.

In some examples, the video parser 102 is configured to process the video feed in real-time as the video feed is received. In these examples, the detection and recognition module 1021 is configured to perform object detection and recognition on the video feed to detect and classify objects therein. The detection and recognition module is also configured to perform activity recognition to detect and classify activities of at least some of the objects, and output classified objects and classified activities in the video feed. In some examples, at least some of the objects are moving objects such as moving vehicles. In these examples, the detection and recognition module is configured to detect and classify the moving objects using motion compensation, background subtraction and convolutional neural networks.

The activities of the objects can be classified. In some examples, the detection and recognition module 1021 is configured to detect and classify at least some of the activities as involving only a single one of the classified objects, multiple ones of the classified objects, or interaction between one or more of the classified objects and a geographic area in the video feed. An example of activities involving only a single one of the classified objects can be turning of a car. An example of activities involving multiple ones of the classified objects can be tailgating of two cars. An example of activities involving interaction between one or more of the classified objects and a geographic area can be entering of a car into a parking lot. After the objects and the activities are classified, in some examples, the natural language generator 1022 is configured to generate natural language text that describes the video feed from the classified objects and activities. For example, the natural language generator can generate natural language text such as "man riding a bicycle" to describe the video feed.

In order to display semantic relationships between the classified objects to a user, in some examples, the semantic network generator 1023 is configured to produce a semantic network including a graph. The graph includes vertices that represent the classified objects, and edges that connect the vertices and represent semantic relationships between the classified objects. At least some of the semantic relationships correspond to respective ones of the classified activities. The semantic network will be described in greater details with reference to FIG. 5 below.

In some examples, the video parsing module 102 is configured to store the video feed, classified objects and classified activities, natural language text, and semantic network in the knowledge base 103. The knowledge base is configured to store information, and can be implemented in any of a number of different manners, such as file storage, database storage, cloud storage or the like.

In some examples, the video exploring module 104 is configured to generate a graphical user interface (GUI) 1041. The GUI is configured to enable queries of the knowledge base 103, as indicated by arrow 105, and presentation of selections of the video feed, classified objects and classified activities, natural language text, and semantic network. In some examples, the video exploring module is configured to generate the GUI configured to enable queries of the knowledge base based on similarity between a user-specified object and one or more of the classified objects in the video feed. For example, the user-specified object can be a white car, and the generated GUI can enable queries of the knowledge base based on similarity between the white car and other cars in the video feed.

The video parsing module 102 can determine physical attributes of the classified objects through geo-registration. In some examples, the geo-registration module 1024 is configured to geo-register the classified objects with respective geographic locations, and including respective trajectories of any moving ones of the classified objects. The physical attributes of the classified objects such as the physical size, heading and speed of cars in the video feed can be determined through the geo-registration. In these examples, the GUI 1041 is configured to present an aerial image or map of a scene in the video feed. The aerial image or map identifies thereon the classified objects at the respective geographic locations and with the respective trajectories of the moving ones of the classified objects.

The video parsing module 102 can also track multiple classified objects. In some examples, the detection and recognition module 1021 is configured to assign respective unique identifiers to the classified objects. In these examples, the presentation of selections of the video feed in the GUI 1041 includes identifying the classified objects on the video feed and including the respective unique identifiers. Assigning respective unique identifiers to the classified objects will be described in greater details with reference to FIG. 3 below.

Figure 2:
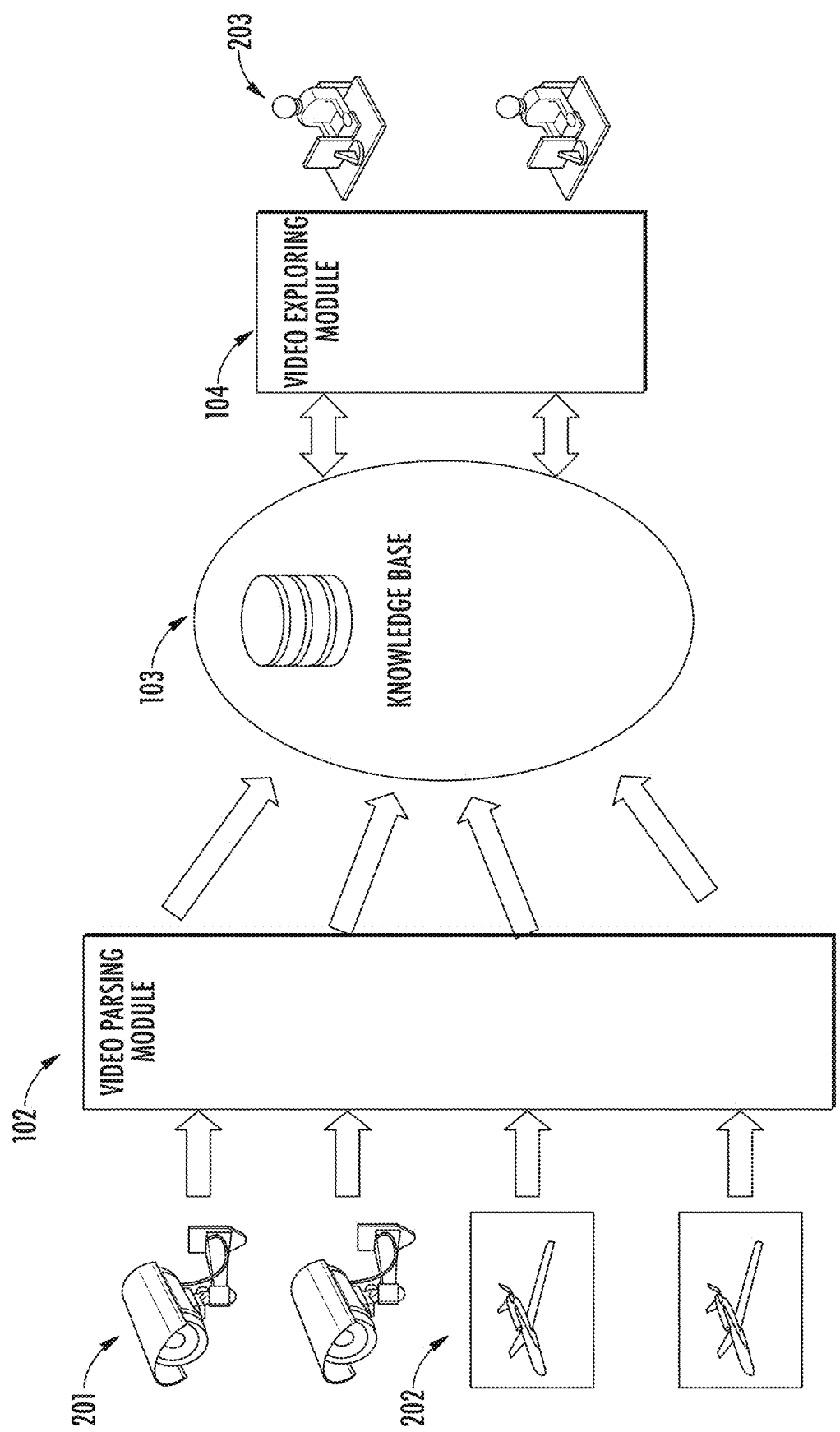
FIG. 2 illustrates a diagram for intelligent video analysis, according to example implementations of the present disclosure.

FIG. 2 illustrates a diagram for intelligent video analysis, according to example implementations of the present disclosure. As shown, in one example, the video parsing module 102 can receive video feeds from multiple sources. Some of the sources can be stationary, e.g., the source 201 can be a stationary camera. Some of the sources can be moving, e.g., the source 202 can be a camera or imaging sensor positioned on a manned or unmanned aerial vehicle. The video parsing module can process the video feeds in real-time as the video feeds are received from the multiple sources. For example, the video parsing module can perform object detection and recognition, perform activity recognition, generate natural language text that describes the video feeds, and produce a semantic network, as described above. The video parsing module can store the video feeds, classified objects and classified activities, natural language text, and semantic network in the knowledge base 103. The video exploring module 104 can generate a GUI (e.g., the GUI 1041). The GUI can enable queries of the knowledge base by users such as the user 203. The GUI can also enable presentation of selections of the video feed, classified objects and classified activities, natural language text, and semantic network.

Figure 3:
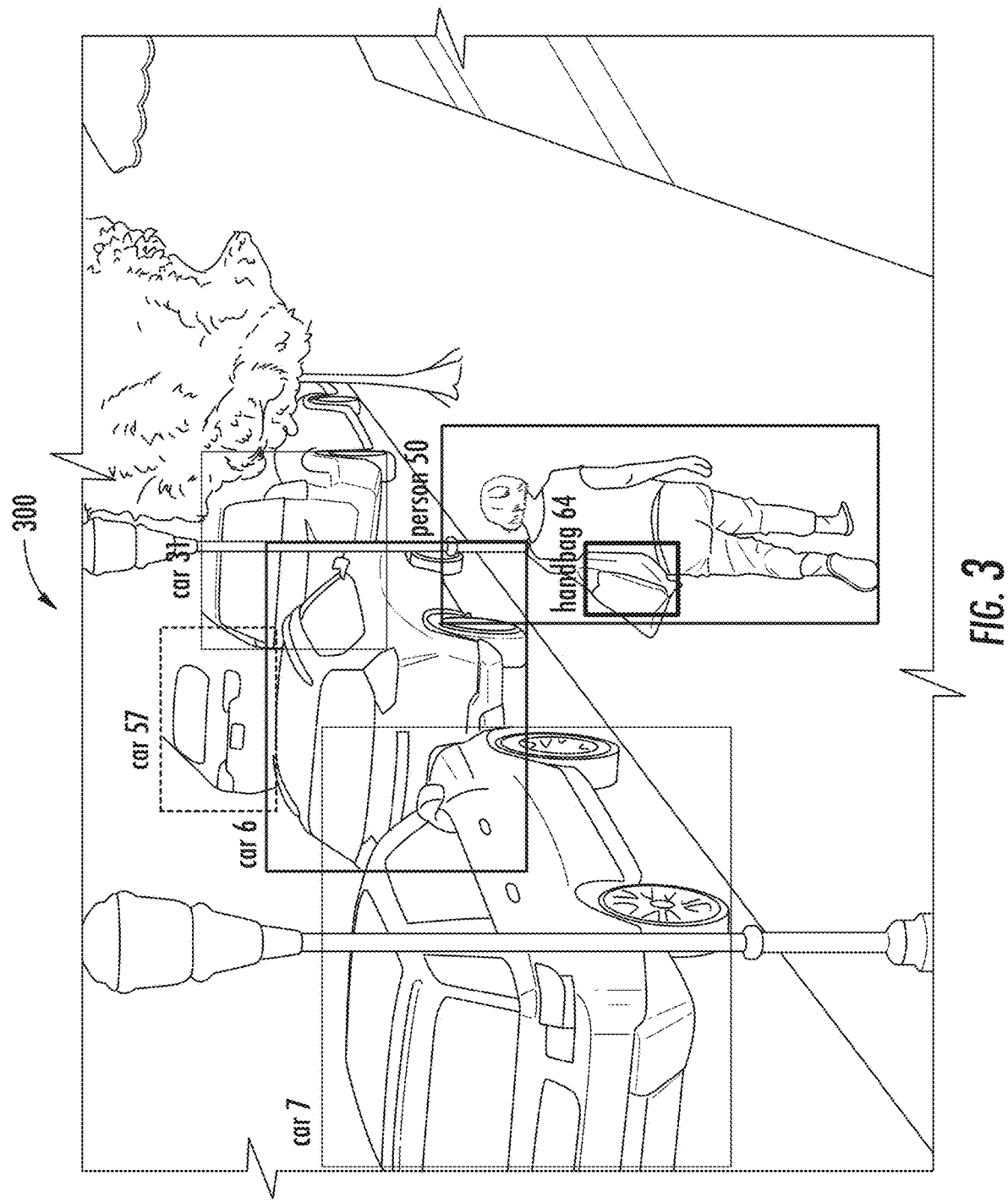
FIG. 3 illustrates detected and classified objects in a video feed, according to example implementations of the present disclosure.

FIG. 3 illustrates detected and classified objects in a video feed, according to example implementations of the present disclosure. As shown, in an image 300 (e.g., a frame of the video feed), the detection and recognition module 1021 can detect and classify objects as "car" or "person" or "handbag" in the video feed. The detection and recognition module can assign respective unique identifiers to the classified objects. For example, the unique identifier "person 50" is assigned to the person in the video feed. The unique identifier for the object can be maintained without change during the appearance of the object in different frames of the video feed. The presentation of the video feed in the GUI includes identifying the classified objects on the video feed and including the respective unique identifiers. For example, "person 50" is presented in the video feed to identify the person in the video feed. In one example, when multiple cameras monitor the same area, the unique identifier for the object can be maintained across different camera views.

Figure 4A:
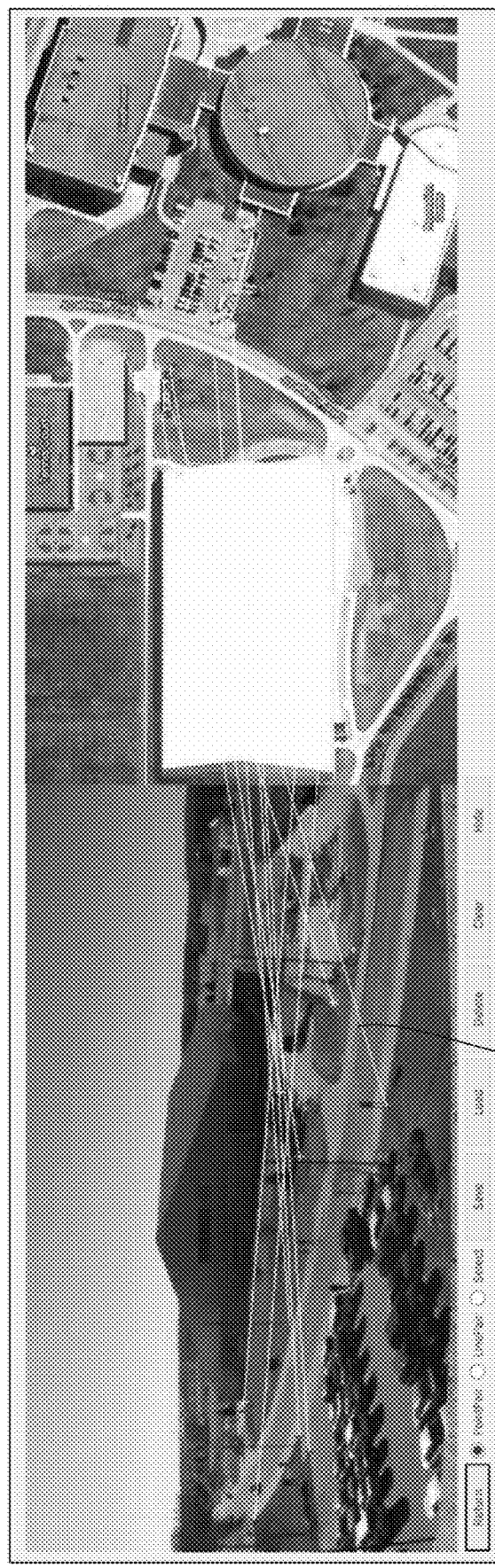
FIGS. 4A and 4B illustrate geo-registration of classified objects, according to example implementations of the present disclosure.
Figure 4B:
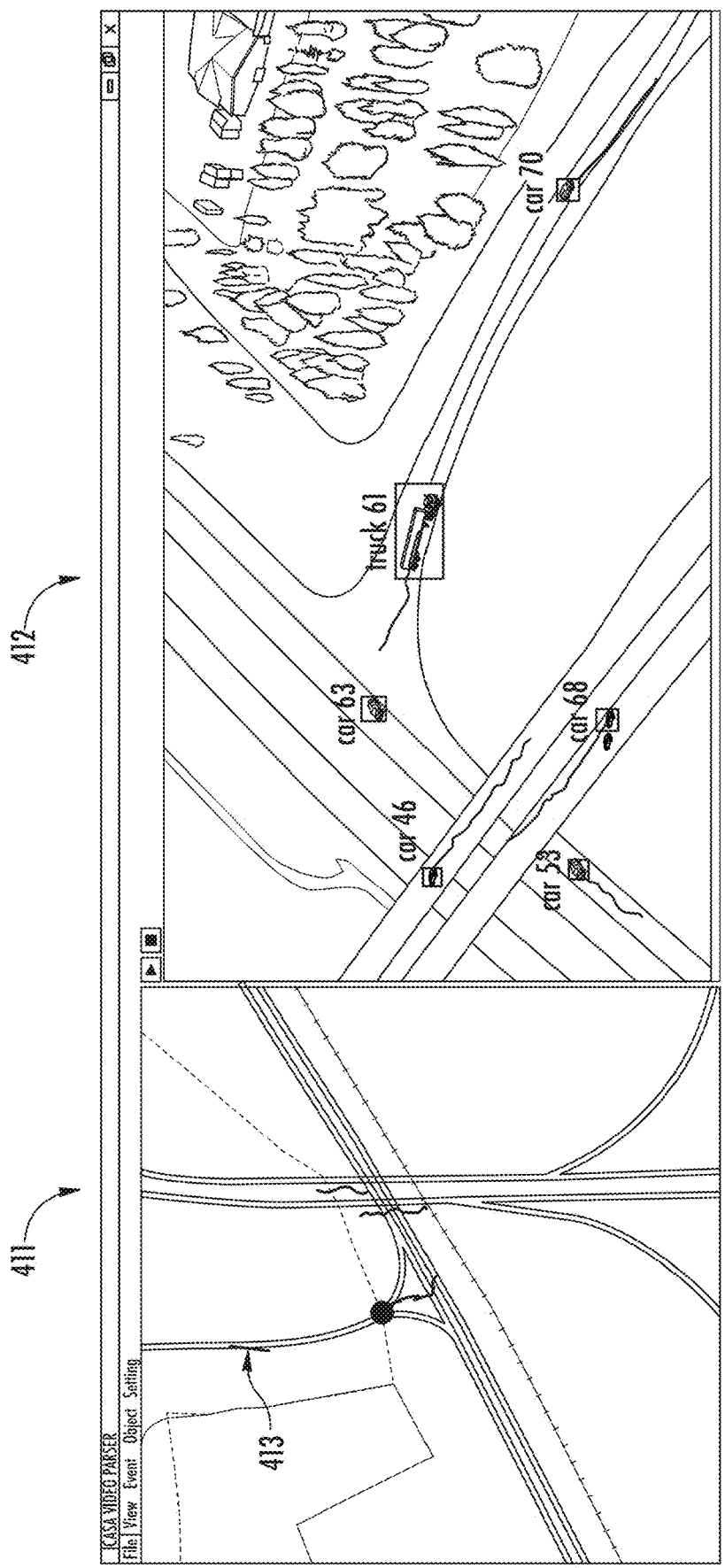

FIGS. 4A and 4B illustrate geo-registration of classified objects, according to example implementations of the present disclosure. The geo-registration module 1024 can register the detected and classified objects and their trajectories against a geo-referenced world map such as Google Maps. The geo-registration module can use a perspective transformation between video frames and the map. FIG. 4A illustrates an example that the video feed is from a stationary camera. In this example, the transformation between video frames and the map can be computed from a set of landmark points manually specified by a user (e.g., through the GUI 1041). For example, the user can enter a set of point correspondences between an image captured by the stationary camera and the map. As shown, the GUI can present a camera-captured image 401 and an overhead view of a map 402. The user can enter lines (e.g., line 403) indicating the point correspondences between the image 401 and the overhead view of the map 402. Each line can connect one point in the image and its corresponding point on the map. Then the geo-registration module can compute a homographic transformation from the image to the map.

FIG. 4B illustrates an example that the video feed is from a moving sensor such as a sensor from a manned or unmanned aerial vehicle. In this example, the geo-registration module 1024 can compute the transformation between video frames and the map using telemetry data of location and orientation of the sensor such as data from the Global Positioning System (GPS). As shown, the GUI 1041 can present a map 411 of an area and an image of the area 412 captured by the moving sensor. The geo-registration module can geo-register the classified objects with respective geographic locations, and including respective trajectories of any moving ones of the classified objects. For example, the geo-registration module can geo-register the car 70 with its geographic location including the trajectory 413 of the car 70. And the GUI can present an aerial image or map of a scene in the video feed, identifying thereon the classified objects at the respective geographic locations and with the respective trajectories of the moving ones of the classified objects. For example, as shown, the GUI can present an image identifying the car 70 at its geographic location with the trajectory 413 of the car 70.

Figure 5:
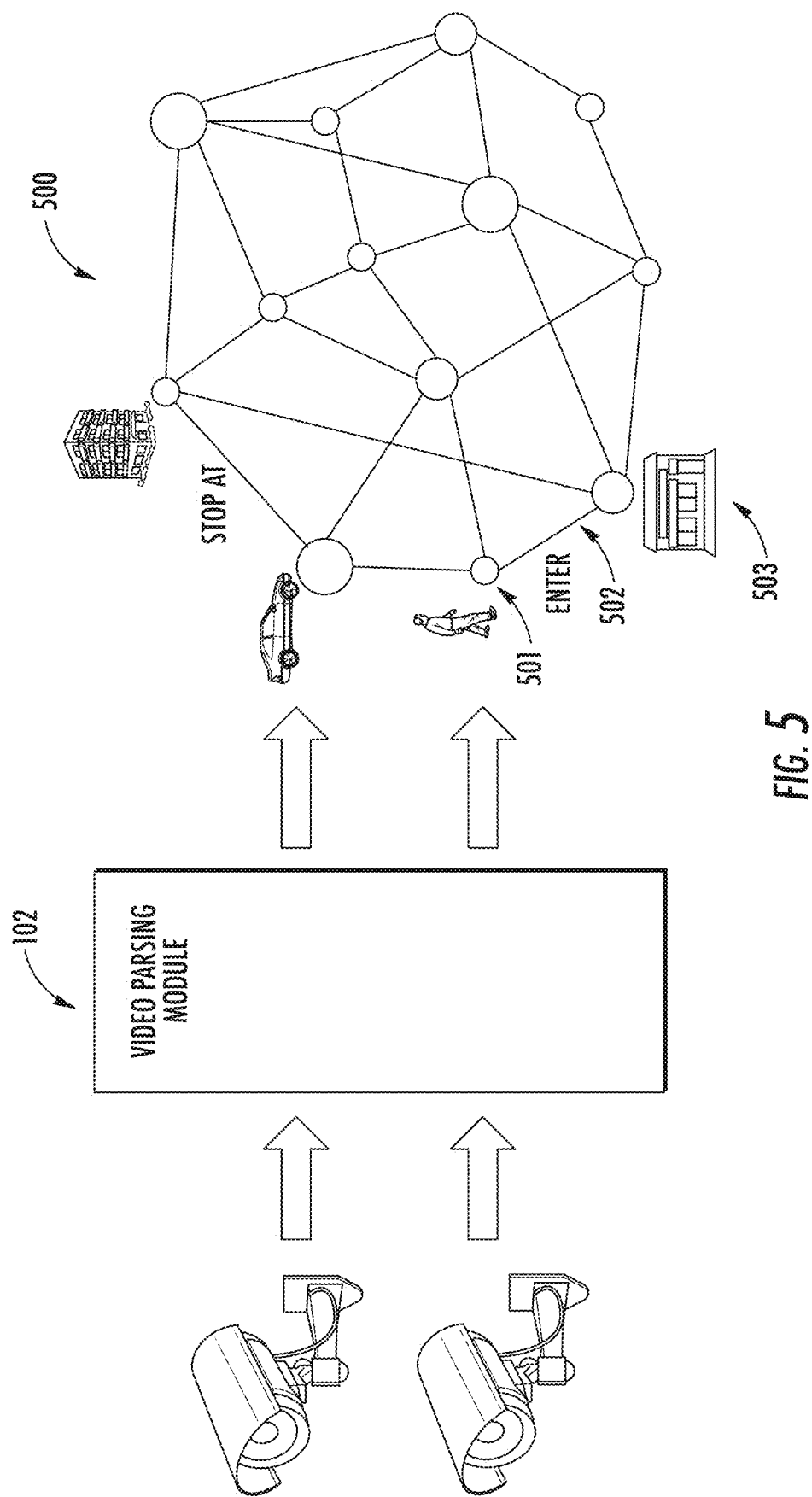
FIG. 5 illustrates a semantic network, according to example implementations of the present disclosure.

FIG. 5 illustrates a semantic network, according to example implementations of the present disclosure. As shown, the semantic network may include a graph 500 with vertices that represent the classified objects, and edges that connect the vertices and represent semantic relationships between the classified objects. Some of the semantic relationships correspond to some classified activities of the classified objects. For example, the vertex 501 can represent a person and vertex 503 can represent a building. The edge 502 that connects vertices 501 and 503 can represent a semantic relationship that the person enters the building.

Figure 6:
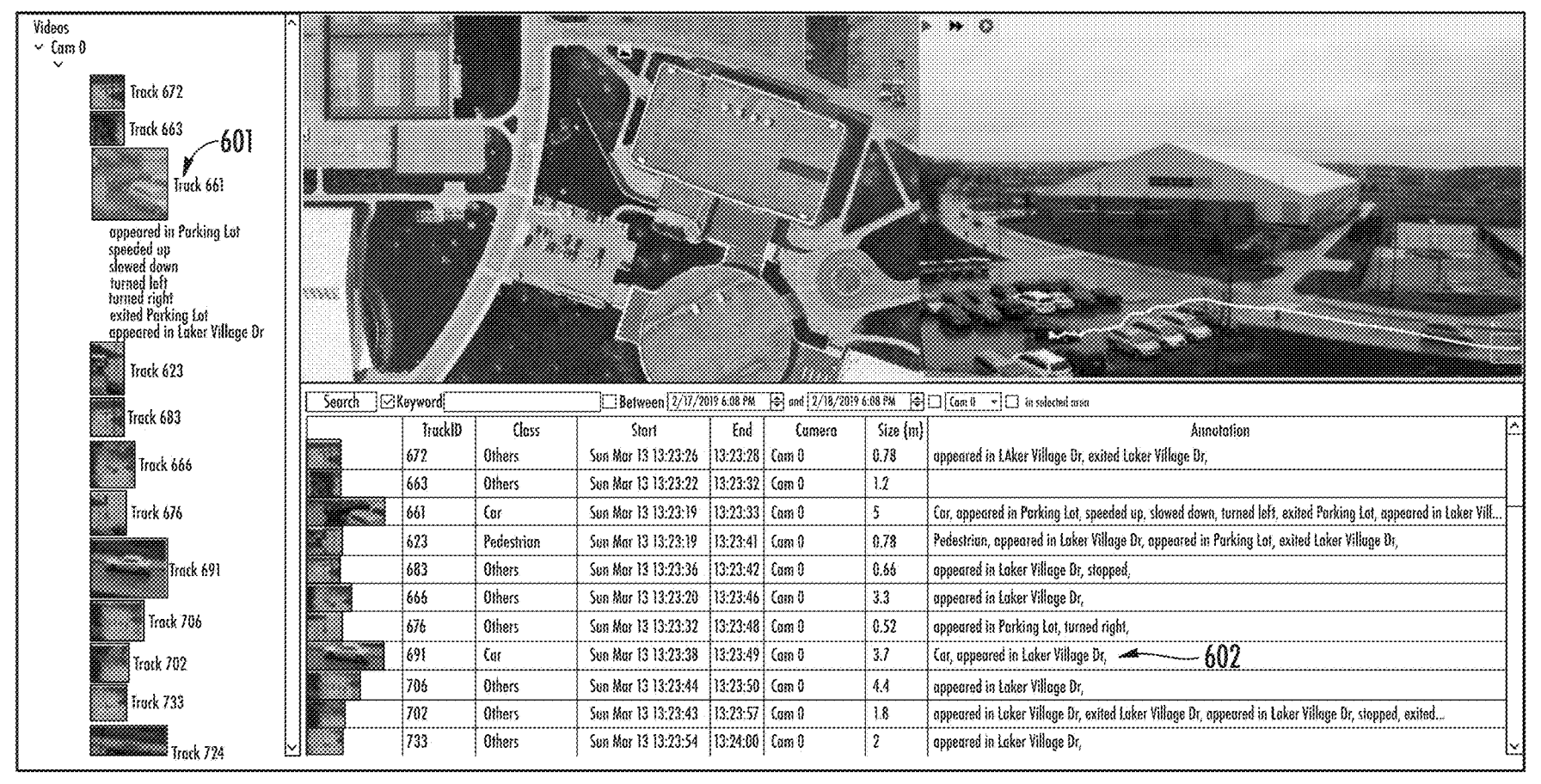

FIG. 6 illustrates a presentation of a video feed in a graphical user interface, according to example implementations of the present disclosure. As shown, in one example, the video feed can include multiple tracks such as tracks 663 and 661. Each vide feed may be 30 minutes long and the each track may be 2 minutes long. Each track may correspond to a specific object or a specific area monitored by a camera. There can be different events in each track. For example, in track 661 as indicated by arrow 601, one event occurred in track 661 can be that a car has turned left. In one example, the natural language generator 1022 can generate natural language text that describes the video feed from the classified objects and activities. For example, as indicated by arrow 602, the natural language text can be "Car, appeared in Laker Village Dr," which describes the car with a track ID 691 in the video feed.

FIG. 7 illustrates queries of a knowledge base, according to example implementations of the present disclosure. As explained above, the GUI 1041 can enable queries of the knowledge base 103 by the user. The queries can be based on keyword entered by the user. The queries can be based on objects or events in a given time widow and/or in a geographical area that is specified by the user. In one example, the queries of the knowledge base can be based on similarity between a user-specified object and one or more of the classified objects in the video feed. For example, as indicated by arrow 701, the user can specify a car and choose "Find Similar" to search visually similar cars as the specified car in the video feed.

Figure 8:
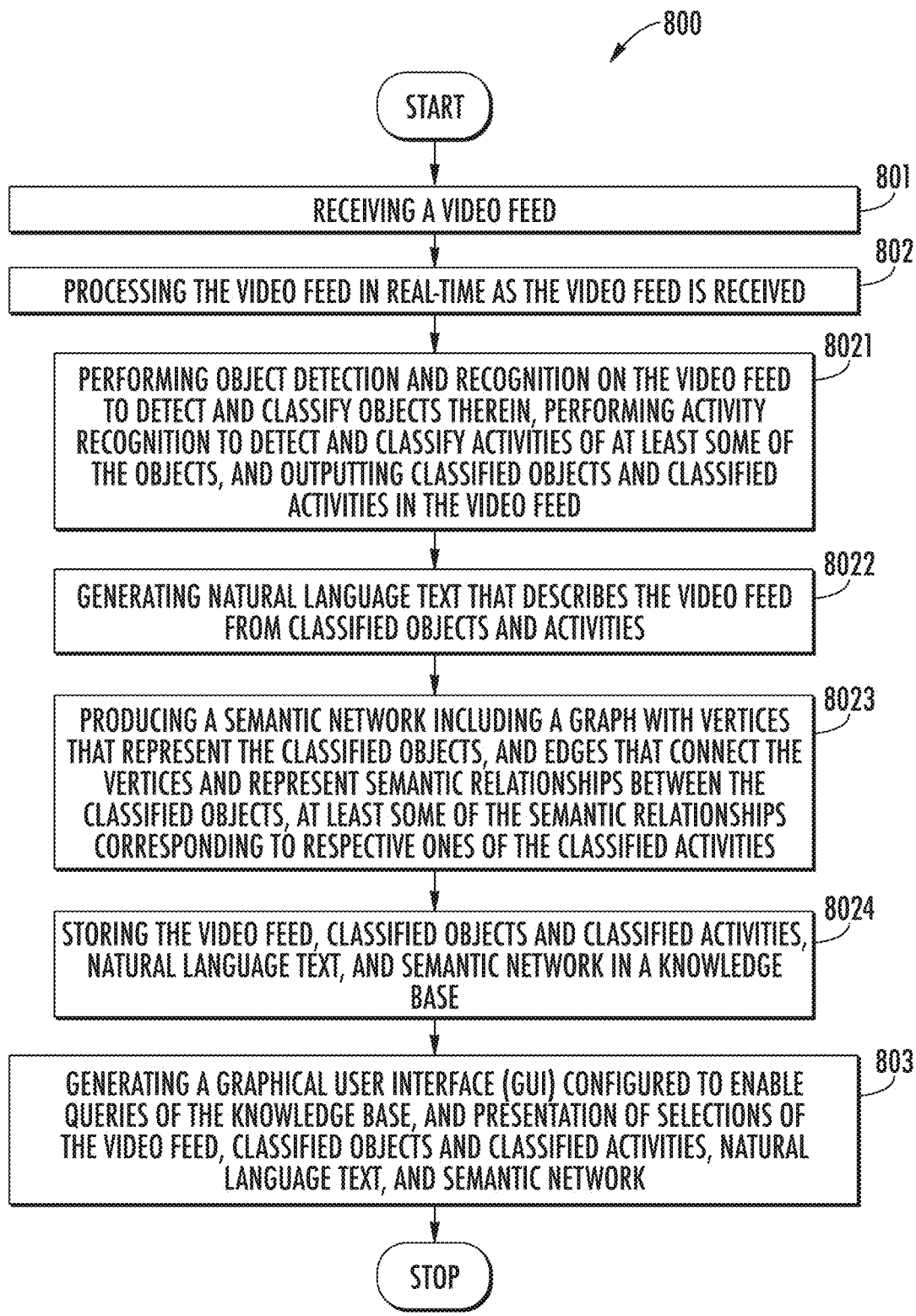
FIG. 8 illustrates a flowchart of various operations in a method of intelligent video analysis, according to example implementations of the present disclosure.

FIG. 8 illustrates a flowchart of various operations in a method of intelligent video analysis, according to example implementations of the present disclosure. As shown, at block 801, the method 800 includes receiving a video feed. At block 802, the method includes processing the video feed in real-time as the video feed is received.

In one example, the operation at block 802 can be further divided into four steps as shown in sub-blocks 8021, 8022, 8023 and 8024. At sub-block 8021, the method 800 includes performing object detection and recognition on the video feed to detect and classify objects therein, performing activity recognition to detect and classify activities of at least some of the objects, and outputting classified objects and classified activities in the video feed. At sub-block 8022, the method includes generating natural language text that describes the video feed from the classified objects and activities. At sub-block 8023, the method includes producing a semantic network including a graph with vertices that represent the classified objects, and edges that connect the vertices and represent semantic relationships between the classified objects, at least some of the semantic relationships corresponding to respective ones of the classified activities. At sub-block 8024, the method includes storing the video feed, classified objects and classified activities, natural language text, and semantic network in a knowledge base.

At block 803, the method 800 includes generating a graphical user interface (GUI) 1041 configured to enable queries of the knowledge base, and presentation of selections of the video feed, classified objects and classified activities, natural language text, and semantic network.

According to example implementations of the present disclosure, the system 100 and its subsystems including the data receiving module 101, video parsing module 102, knowledge base 103 and video exploring module 104 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

Figure 9:
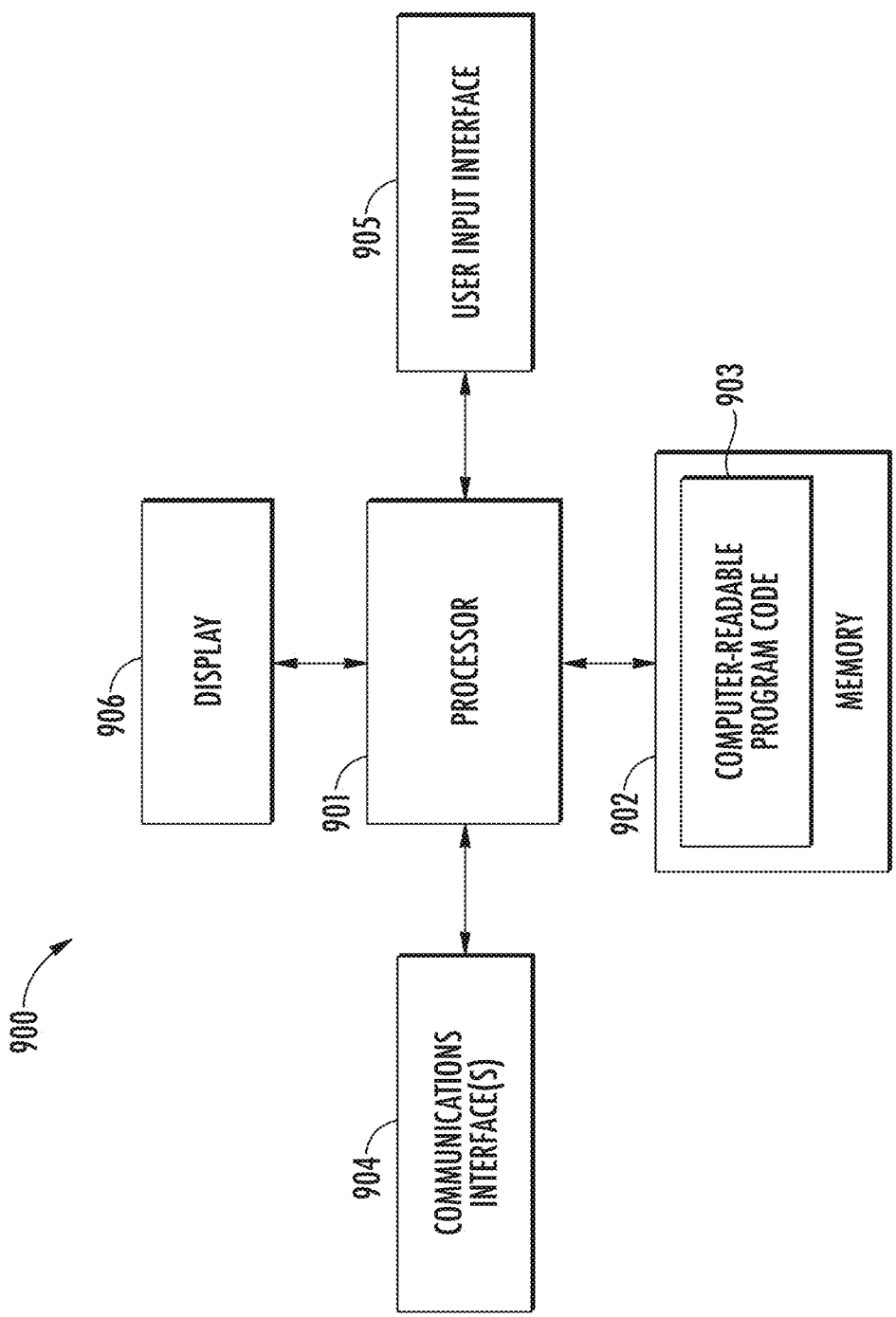
FIG. 9 illustrates an apparatus according to some example implementations.

FIG. 9 illustrates an apparatus 900 according to some example implementations. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processor 901 (e.g., processing circuitry) connected to a memory 902 (e.g., storage device). In some examples, the apparatus 900 implements the system 100.

The processor 901 may be composed of one or more processors alone or in combination with one or more memories. The processor is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 902 (of the same or another apparatus).

The processor 901 may be a number of processors, a multi-core processor or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program. In either instance, the processor may be appropriately programmed to perform functions or operations according to example implementations of the present disclosure.

The memory 902 is generally any piece of computer hardware that is capable of storing information such as, for example, data, computer programs (e.g., computer-readable program code 903) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 902, the processor 901 may also be connected to one or more interfaces for displaying, transmitting and/or receiving information. The interfaces may include a communications interface 904 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 906 and/or one or more user input interfaces 905 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, keyboard or keypad, joystick, touch-sensitive surface (separate from or integrated into a touchscreen), biometric sensor or the like. The user interfaces may further include one or more interfaces for communicating with peripherals such as printers, scanners or the like. In some examples, the user interfaces include the GUI 1041.

As indicated above, program code instructions may be stored in memory, and executed by processor that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 900 may include a processor 901 and a computer-readable storage medium or memory 902 coupled to the processor, where the processor is configured to execute computer-readable program code 903 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising a processor and a memory storing executable instructions that, in response to execution by the processor, cause the apparatus to:
   receive a video feed comprising video from multiple sources, including a moving aerial source;
   process the video feed in real-time as the video feed is received, including the apparatus being caused to:
   perform object detection and recognition on the video feed to detect and classify objects therein, perform activity recognition to detect and classify activities of at least some of the objects, and output classified objects and classified activities in the video feed, wherein the classified activities comprise an interaction between one or more of the classified objects and a geographic area in the video feed;
   generate natural language text that describes the video feed from the classified objects and activities;
   produce a semantic network including a graph with vertices that represent the classified objects, and edges that connect the vertices and represent semantic relationships between the classified objects, at least some of the semantic relationships corresponding to respective ones of the classified activities;
   geo-register the classified objects with respective geographic locations; and
   store the video feed, classified objects and classified activities, natural language text, and semantic network in a knowledge base; and
   generate a graphical user interface (GUI) configured to enable queries of the knowledge base, and presentation of selections of the video feed, classified objects and classified activities, natural language text, and semantic network.

2. The apparatus of claim 1, wherein the apparatus being caused to geo-register the classified objects includes respective trajectories of any moving ones of the classified objects, and
   wherein the GUI is further configured to present an aerial image or map of a scene in the video feed, identifying thereon the classified objects at the respective geographic locations and with the respective trajectories of the moving ones of the classified objects.

3. The apparatus of claim 1, wherein the apparatus being caused to perform object detection and recognition includes being caused to assign respective unique identifiers to the classified objects, and the presentation of selections of the video feed in the GUI includes identifying the classified objects on the video feed and including the respective unique identifiers.

4. The apparatus of claim 1, wherein at least some of the objects are moving objects, and the apparatus being caused to perform object detection and recognition includes being caused to detect and classify the moving objects using motion compensation, background subtraction and convolutional neural networks.

5. The apparatus of claim 1, wherein the apparatus being caused to generate the GUI includes being caused to generate the GUI configured to enable queries of the knowledge base based on similarity between a user-specified object and one or more of the classified objects in the video feed.

6. The apparatus of claim 1, wherein the video feed is divided into tracks that are fractions of a duration of the video feed, each track corresponding to a classified object of the classified objects in the track, or a source of the multiple sources of the video, and
   wherein the apparatus is caused to generate the natural language text for respective ones of the tracks that describes the respective ones of the tracks from those of the classified objects and those of the classified activities therein.

7. The apparatus of claim 6, wherein the apparatus is caused to generate the GUI that is configured to enable queries of the tracks of the video feed based on those of the classified activities in the respective ones of the tracks, and the natural language text that describes the respective ones of the tracks.

8. A method of intelligent video analysis, the method comprising:
   receiving a video feed comprising video from multiple sources, including a moving aerial source;
   processing the video feed in real-time as the video feed is received, including: performing object detection and recognition on the video feed to detect and classify objects therein, performing activity recognition to detect and classify activities of at least some of the objects, and outputting classified objects and classified activities in the video feed, wherein the classified activities comprise an interaction between one or more of the classified objects and a geographic area in the video feed;
   generating natural language text that describes the video feed from the classified objects and activities;
   producing a semantic network including a graph with vertices that represent the classified objects, and edges that connect the vertices and represent semantic relationships between the classified objects, at least some of the semantic relationships corresponding to respective ones of the classified activities;
   geo-registering the classified objects with respective geographic locations; and storing the video feed, classified objects and classified activities, natural language text, and semantic network in a knowledge base; and
   generating a graphical user interface (GUI) configured to enable queries of the knowledge base, and presentation of selections of the video feed, classified objects and classified activities, natural language text, and semantic network.

9. The method of claim 8, wherein geo-registering the classified objects includes respective trajectories of any moving ones of the classified objects, and wherein the GUI is further configured to present an aerial image or map of a scene in the video feed, identifying thereon the classified objects at the respective geographic locations and with the respective trajectories of the moving ones of the classified objects.

10. The method of claim 8, wherein performing object detection and recognition includes assigning respective unique identifiers to the classified objects, and the presentation of selections of the video feed in the GUI includes identifying the classified objects on the video feed and including the respective unique identifiers.

11. The method of claim 8, wherein at least some of the objects are moving objects, and performing object detection and recognition includes detecting and classifying the moving objects using motion compensation, background subtraction and convolutional neural networks.

12. The method of claim 8, wherein generating the GUI includes generating the GUI configured to enable queries of the knowledge base based on similarity between a user-specified object and one or more of the classified objects in the video feed.

13. The method of claim 8, wherein the video feed is divided into tracks that are fractions of a duration of the video feed, each track corresponding to a classified object of the classified objects in the track, a source of the multiple sources of the video, and the method comprising generating the natural language text for respective ones of the tracks that describes the respective ones of the tracks from those of the classified objects and those of the classified activities therein.

14. The method of claim 13, wherein generating the GUI comprises generating a GUI that is configured to enable queries of the tracks of the video feed based on those of the classified activities in the respective ones of the tracks, and the natural language text that describes the respective ones of the tracks.

15. A non-transitory computer-readable storage medium having computer-readable program code stored therein that in response to execution by a processor, causes an apparatus to:

receive a video feed comprising video from multiple sources, including a moving aerial source;

process the video feed in real-time as the video feed is received, including the apparatus being caused to:

perform object detection and recognition on the video feed to detect and classify objects therein, perform activity recognition to detect and classify activities of at least some of the objects, and output classified objects and classified activities in the video feed, wherein the classified activities comprise an interaction between one or more of the classified objects and a geographic area in the video feed;

generate natural language text that describes the video feed from the classified objects and activities;

produce a semantic network including a graph with vertices that represent the classified objects, and edges that connect the vertices and represent semantic relationships between the classified objects, at least some of the semantic relationships corresponding to respective ones of the classified activities geo-register the classified objects with respective geographic locations; and store the video feed, classified objects and classified activities, natural language text, and semantic network in a knowledge base; and generate a graphical user interface (GUI) configured to enable queries of the knowledge base, and presentation of selections of the video feed, classified objects and classified activities, natural language text, and semantic network.

16. The computer-readable storage medium of claim 15, wherein the apparatus being caused to geo-register the classified objects includes respective trajectories of any moving ones of the classified objects, and wherein the GUI is further configured to present an aerial image or map of a scene in the video feed, identifying thereon the classified objects at the respective geographic locations and with the respective trajectories of the moving ones of the classified objects.

17. The computer-readable storage medium of claim 15, wherein the apparatus being caused to perform object detection and recognition includes being caused to assign respective unique identifiers to the classified objects, and the presentation of selections of the video feed in the GUI includes identifying the classified objects on the video feed and including the respective unique identifiers.

18. The computer-readable storage medium of claim 15, wherein at least some of the objects are moving objects, and the apparatus being caused to perform object detection and recognition includes being caused to detect and classify the moving objects using motion compensation, background subtraction and convolutional neural networks.

19. The computer-readable storage medium of claim 15, wherein the apparatus being caused to generate the GUI includes being caused to generate the GUI configured to enable queries of the knowledge base based on similarity between a user-specified object and one or more of the classified objects in the video feed.

20. The apparatus of claim 1, wherein the moving aerial source is an unmanned aerial vehicle.

21. The apparatus of claim 1, wherein the GUI is further configured to present an aerial image or map identifying a geographic location of at least one of the multiple sources.

22. The method of claim 8, wherein the moving aerial source is an unmanned aerial vehicle.

23. The method of claim 8, wherein the GUI is further configured to present an aerial image or map identifying a geographic location of at least one of the multiple sources.

24. The computer-readable storage medium of claim 15, wherein the moving aerial source is an unmanned aerial vehicle.

25. The computer-readable storage medium of claim 15, wherein the GUI is further configured to present an aerial image or map identifying a geographic location of at least one of the multiple sources.

26. The computer-readable storage medium of claim 15, wherein the video feed is divided into tracks that are fractions of a duration of the video feed, each track corresponding to a classified object of the classified objects in the track, or a source of the multiple sources of the video, and wherein the apparatus is caused to generate the natural language text for respective ones of the tracks that describes the respective ones of the tracks from those of the classified objects and those of the classified activities therein.

27. The computer-readable storage medium of claim 26, wherein the apparatus is caused to generate the GUI that is configured to enable queries of the tracks of the video feed based on those of the classified activities in the respective ones of the tracks, and the natural language text that describes the respective ones of the tracks.

* * * * *